United States Patent [19]
Ohki et al.

[11] Patent Number: 6,106,770
[45] Date of Patent: Aug. 22, 2000

[54] METHOD FOR PREVENTING OBSTRUCTION IN ALUMINUM BRASS PIPES IN A WATER FLOW PATH

[75] Inventors: Keiji Ohki, Tokyo; Kunio Nishimura; Yoshiharu Wakao, both of Osaka, all of Japan

[73] Assignees: Mitsubishi Gas Chemical Company Inc., Tokyo; Katayama Chemical Inc., Osaka, both of Japan

[21] Appl. No.: 09/110,326

[22] Filed: Jul. 6, 1998

[30] Foreign Application Priority Data

Jul. 11, 1997 [JP] Japan ..................... 9-186901

[51] Int. Cl.[7] .................... C23F 11/00; C23F 11/18
[52] U.S. Cl. .................... 422/7; 422/12; 422/13; 422/19; 422/28; 422/40
[58] Field of Search .................... 422/7, 19, 12, 422/13, 28, 40

[56] References Cited

U.S. PATENT DOCUMENTS 4,860,821  8/1989  Hagewood ................. 165/95

FOREIGN PATENT DOCUMENTS 61-2439  1/1986  Japan .
2-47277  10/1990  Japan .
4-4038  1/1992  Japan .

OTHER PUBLICATIONS

English Language Abstract of family member 54–161592, Dec. 21, 1979.
English Language Abstract of family member 60–106584, Dec. 06, 1985.
English Language Abstract of family member 59–098791, Jun. 7, 1984.
Themal Nuclear Electric Power Generation, vol. 24, No. 10, pp. 1145–1156, Oct. 1973.

*Primary Examiner*—Krisanne Thornton
*Attorney, Agent, or Firm*—Greenblum & Bernstein, P.L.C.

[57] ABSTRACT

A method for preventing obstruction in aluminum brass pipes in a water flow path, including the steps of continuously supplying iron ions or an iron ion supply compound to water in the water flow path in such a manner that a concentration of iron ions in the water is 0.005 to 0.05 mg/liter, and supplying hydrogen peroxide or a hydrogen peroxide supply compound for a period of time sufficient for preventing adhesion of organisms to the aluminum brass pipes but not impeditive to formation of corrosion-resistant coating inside the pipes, in such a manner that a concentration of hydrogen peroxide in the water is 0.1 to 1.5 mg/liter, whereby corrosion of aluminum brass pipes and adhesion of organisms to the pipes are prevented.

10 Claims, No Drawings

METHOD FOR PREVENTING OBSTRUCTION IN ALUMINUM BRASS PIPES IN A WATER FLOW PATH

CROSS-REFERENCE TO RELATED APPLICATION

This application is related to Japanese application No. HEI9(1997)-186901, filed on Jul. 11, 1997 whose priority is claimed under 35 USC § 119, the disclosure of which is incorporated by reference in its entirety.

BACKGROUND OF THE INVENTION

1. Field of the Invention

The present invention relates to a method for preventing obstruction in aluminum brass pipes which are used for a flow path for water. In particular, the invention relates to a method for preventing obstruction caused by corrosion of aluminum brass pipes and by adhesion of organisms to the aluminum brass pipes. The aluminum brass pipes are used in an industrial cooling water system.

2. Description of Related Art

Aluminum brass pipes, which have a relatively high resistance to corrosion, are conventionally used as capillaries of condensers in nuclear power plants and thermal power plants. In such condensers, obstruction is still caused by corrosion of capillaries, particularly pitting corrosion thereof, and by adhesion of organisms such as mussels (scientific name: *Mytilus coruscum*), blue mussels (scientific name: *Mytilus edulis*), freshwater bivalves such as *Limnoperna fortunei* (scientific name) and barnacles to aluminum brass pipes. The pitting corrosion of capillaries causes leakage of the water, and the adhesion of organisms to the pipes causes blockage of the pipes and impediment of thermal conduction.

In order to cope with the corrosion of aluminum brass pipes, a method is conventionally proposed and carried out wherein ferrous sulfate is continuously added to the water at a low iron ion concentration of about 0.01 to 0.03 ppm (Thermal Nuclear Electric Power Generation, Vol.24. No.10. pp. 1145 to 1156, 1973). Thereby, the aluminum brass pipes are prevented from corroding by iron ions provided to form a corrosion-resistant coating of iron hydroxide on inside surfaces of the pipes.

On the other hand, to cope with the adhesion of organisms to aluminum brass pipes, a chlorination agent or an organic compound is conventionally added. However, in consideration of the environment, the use thereof is not desired. Accordingly, proposed is a method for preventing adhesion of organisms using hydrogen peroxide or an agent capable of generating hydrogen peroxide (Japanese Patent Publication No.SHO 61(1986)-2439). Hydrogen peroxide is easy to decompose, does not cause a problem such as residual toxicity or accumulated toxicity and therefore is safer.

The inventors of the present invention propose methods for preventing the adhesion of organisms using both hydrogen peroxide and iron ions for the purpose of reducing the concentration of added hydrogen peroxide (Japanese Patent Publications Nos.HEI 2(1990)-47277 and HEI 4(1992)-4038).

These methods exhibit a remarkable so-called synergistic effect of hydrogen peroxide and iron ions. Even when the concentration of hydrogen peroxide is reduced to 0.05 to 3 mg/liter, the adhesion of mussels, blue mussels and the like to aluminum brass pipes can be prevented about 98% or more and the growth thereof can also be prevented. The inventors actually carried out the above inventions using model plants in an nuclear power plant and a thermal power plant. Results showed that when hydrogen peroxide and iron ions are added continuously for 24 hours a day, particularly remarkable effect was observed in preventing the adhesion and the growth of organisms.

However, the inventors found that the corrosion-resistant coating of iron hydroxide was not formed on the inside surface of aluminum brass pipes used as capillaries of condensers and that the aluminum brass pipes were corroded, which often results in pitting corrosion. It is considered that hydrogen peroxide inhibit development of the corrosion-resistant coating from iron ions on the inside surface of the aluminum brass pipes.

Then, the inventors has repeated studies and experiments on relation of the addition amount of hydrogen peroxide and iron ions and an adding time period to the formation of the corrosion-resistant coating, finally to find that when the addition amount of iron ion is increased, the corrosion-resistant coating is formed and the corrosion of aluminum brass pipes is prevented. However, the formed corrosion-resistant coating has a considerable thickness and therefore the thermal conductivity declines. In addition to that, because of iron hydroxide particles in the water, the water itself turns brown or bubbles produced at a water outlet are colored.

On the other hand, it is found that, if the addition amount of hydrogen peroxide is decreased within a range which ensures the prevention of the adhesion of organisms to aluminum brass pipes, the corrosion-resistant coating is not formed and therefore the pitting corrosion of pipes cannot be prevented.

SUMMARY OF THE INVENTION

An object of the present invention is to provide a method for preventing obstruction in aluminum brass pipes used for a water flow path by use of hydrogen peroxide and iron ions. The method can prevent the corrosion, particularly the pitting corrosion, of the aluminum brass pipes as well as the adhesion of organisms to the pipes.

After further studies, the inventors of the present invention have found unexpectedly that, by adding iron ions continuously and adding a specific amount of hydrogen peroxide for a specific time period, a good corrosion-resistant coating of iron hydroxide is formed and the pitting corrosion is prevented. Further, the inventors have found that, under the above condition, the preventing effect on the adhesion of organisms to the pipes and the growth thereof is not impeded, and have achieved the present invention.

The present invention provides a method for preventing obstruction in aluminum brass pipes in a water flow path, comprising the steps of continuously supplying iron ions or an iron ion supply compound to water in the water flow path in such a manner that a concentration of iron ions in the water is 0.005 to 0.05 mg/liter; and supplying hydrogen peroxide or a hydrogen peroxide supply compound for a period of time sufficient for preventing adhesion of organisms to aluminum brass pipes but not impeditive to formation of corrosion-resistant coating inside the pipes, in such a manner that a concentration of hydrogen peroxide in the water is 0.1 to 1.5 mg/liter, whereby corrosion of aluminum brass pipes and adhesion of organisms to the pipes are prevented.

DESCRIPTION OF THE PREFERRED EMBODIMENTS

In the present invention, both ferrous ions and ferric ions may be used as iron ions, but in view of the prevention of corrosion of aluminum brass pipes, the ferrous ions are preferred.

Examples of compounds supplying iron ions include iron salts such as ferrous sulfate, ferrous chloride, ammonium ferrous sulfate, ferric sulfate and ferric chloride. Among these compounds, ferrous sulfate and ferric sulfate are preferred, and ferrous sulfate is particularly preferred. These iron ion supply compounds can be used as a mixture of two or more thereof. The iron ions are preferably added to water which passes through aluminum brass pipes in a water flow path, in the form of an aqueous solution of the iron ion supply compound. However, it is also possible to use iron ions generated by electrolysis and iron ions generated spontaneously from an iron pipe with which a part of a water system as the water flow path is replaced or from iron filings placed in the water system.

In the method of the present invention, the iron ions or the iron ion supply compound are continuously supplied into the water in the water system. The concentration of iron ions in the water may be varied depending on conditions such as the kind and temperature of the water, the kind of the iron ions or the iron ion supply compound and the like, but generally the concentration is preferably 0.005 to 0.05 mg/liter, more preferably 0.01 to 0.03 mg/liter.

If the concentration of iron ions in the water is lower than 0.005 mg/liter, the preventing effect on the corrosion of the aluminum brass pipes is not exhibited. On the other hand, when the concentration of iron ions in the water exceeds 0.05 mg/liter, the corrosion-resistance coating produced inside the aluminum brass pipes becomes thick and as a result, the heat conductivity declines. Also the water itself turns brown due to iron hydroxide particles in the water and bubbles generated at a water outlet are colored. Further, if the iron ions are supplied intermittently, the corrosion-resistant coating is not formed inside the aluminum brass pipes.

Hydrogen peroxide used in the method of the present invention is preferably a 3 to 60% aqueous solution of hydrogen peroxide, which is marketed for industrial use. The hydrogen peroxide supply compounds mean compounds capable of releasing hydrogen peroxide in water, specifically, inorganic peroxides such as sodium perborate, sodium carbonate peroxyhydrate and sodium persulfate, organic peroxides such as peracetic acid and salts thereof. These hydrogen peroxide supply compounds may be diluted with water or flash water, as needed, when supplied to the water in the water system. Alternatively, hydrogen peroxide generated by electrolysis or the like in the water system or in other water system may be used. The concentration of hydrogen peroxide in the water may be varied depending on conditions such as the kind and temperature of the water, the kind of the hydrogen peroxide supply compound and the like, but generally the concentration is preferably 0.1 to 1.5 mg/liter, more preferably 0.2 to 1 mg/liter.

In the method of the present invention, hydrogen peroxide or the hydrogen peroxide supply compound is supplied in the water in the water system for a period of time sufficient for preventing adhesion of organisms to the aluminum brass pipes but not impeditive to formation of corrosion-resistant coating inside the pipes. The period of time may be varied depending on conditions such as the kind and temperature of the water, the kind of the hydrogen peroxide supply compound, the concentration of hydrogen peroxide in the water and the like, but generally the period of time is preferably 14 to 20 hours a day, more preferably 16 to 20 hours a day.

If the concentration of hydrogen peroxide in the water is lower than 0.1 mg/liter, the preventing effect on organisms is not sufficient. On the other hand, even if the concentration of hydrogen peroxide in the water exceeds 1.5 mg/liter, the preventing effect on the adhesion of organisms is not improved. Furthermore, this is not preferable in an economical point of view. In addition to that, a higher concentration of hydrogen peroxide impedes the formation of the corrosion-resistant coating inside the aluminum brass pipes from the iron ions.

If hydrogen peroxide is supplied for less than 14 hours a day, the adhesion of organisms may be prevented unsufficiently. On the other hand, if the hydrogen peroxide is supplied for more than 20 hours a day, the formation of the corrosion-resistant coating inside the aluminum brass pipes from the iron ions may be hindered.

As long as hydrogen peroxide is supplied for a time period within the above range a day, hydrogen peroxide may be intermittently supplied into the water system. However, hydrogen peroxide is preferably supplied without a break in view of preventing the adhesion of organisms to the pipes.

In the present invention, water includes seawater, brackish water, river water and the like. The invention is preferably applied to seawater and brackish water.

In the present invention, the iron ions or iron ion supply compound and hydrogen peroxide or the hydrogen peroxide supply compound may be supplied into the water in any manner so long as both the above-mentioned components are not mixed with each other before being supplied. It is not particularly limited at what part of the water system including the aluminum brass pipes the iron ions or iron ion supply compound and hydrogen peroxide or the hydrogen peroxide supply compound are supplied, so long as they are supplied upstream to the place where the preventing effect on the adhesion of organisms and the corrosion of the aluminum brass pipes needs to be obtained. For example, it is preferable to supply them at a place between an entrance of an intake bay and an outlet conduit of a circulating pump for inhaling the water. In order to obtain better preventing effect on the adhesion of organisms, the above components are preferably supplied at places which are close to each other. More particularly, it is preferred that the components are supplied at the same place or at adjacent places.

According to the method of the present invention, the iron ions and the iron ion supply compound not only form the corrosion-resistant coating on the inside surface of the aluminum brass pipes to prevent corrosion, especially pitting corrosion, but also exhibit synergetic effect with hydrogen peroxide or the hydrogen peroxide supply compound, which is used together with the iron ions or the iron ion supply compound, for preventing obstruction caused by organisms adhering to the pipes.

EXAMPLES

The present invention is now described in detail with examples and comparative examples, but the examples are not to be constructed to limit the scope of the invention.

Example 1

A test was carried out using model flow paths in a breeding season of blue mussels (*Mytilus edulis*) which cause the greatest adhesion problem compared with other marine organisms. Acrylic pipes (inner diameter 65 mm×length 450 mm) were cut into halves. Nets of KURE-MONA (a synthetic polyvinyl alcohol resin fiber produced by Kuraray, Co., Ltd., Japan) of 5 mm mesh were put inside the acrylic pipes and thus sample pieces were prepared.

These sample pieces were inserted in columns (inner diameter 65 mm×length 450 mm) along walls of the columns, and thus columns for study on adhering organisms were prepared. These columns and aluminum brass pipes (BsEF2 pipes, two new pipes of inner diameter 16 mm×length 100 mm are connected in series) for study on corrosion were placed in the model flow paths. Seawater taken from a depth of 1 to 2 meters was passed through the columns and the aluminum brass pipes at a flow rate of about 1 m$^3$/hour. Varied amounts of agents were added by constant delivery pumps for several time periods. Thus the effectiveness of the agents was observed.

The average flow speed was set to about 0.1 m/sec. and about 1.6 m/sec. in the adhering creature study columns and in the corrosion study aluminum brass pipes, respectively.

Used as the ferrous ions was an aqueous solution prepared by diluting an reagent of ferrous sulfate with flesh water to a concentration of 200 g/liter. Used as hydrogen peroxide was an aqueous solution of about 10% prepared by diluting a 35% aqueous solution of hydrogen peroxide for industrial use with flesh water.

The supply of the seawater and the agents were continued for 40 days. Then the sample pieces were taken out. Blue mussels and barnacles adhering to the sample pieces were counted with the eye and individuals which just started adhesion were observed with a laboratory microscope. The length of blue mussels and the bottom major axis of barnacles were measured and averaged. Results are shown in Table 1.

One pipe of each series of the connected aluminum brass pipes (length 100 mm) for corrosion study was determined about its polarization resistance value using a potentiostat in order to evaluate the corrosion resistance of an iron coating formed on the inside surface of the pipe. The other pipe of each aluminum brass pipes series was cut into halves, the inside condition (the condition of the iron coating) thereof was observed with the eye. Then, adhering substances were scratched together and the amount of iron in the adhering substances was determined by X-ray diffraction. Then these half-cut aluminum brass pipe was acid-washed. The number of holes by pitting corrosion and the maximum depth thereof were measured by a depth-of-focus method with an optical microscope. Results are shown in Table 1.

TABLE 1

| Items | Used Agents | Use Amount (mg/L) | Adding Time (hr) | Blue Mussels Number (/m$^2$) | Blue Mussels Average Length (mm) | Barnacles Number (/m$^2$) | Barnacles Average Bottom Major Axis (mm) | Polarization Resistance Value (Ω/cm$^2$) | Iron Coating Status (with Eye) | Amount of Adhering Iron (mg/cm$^2$) | Number of holes by pitting corrosion (/cm$^2$) | Maximum Depth of holes by pitting corrosion (μm) |
|---|---|---|---|---|---|---|---|---|---|---|---|---|
| EXAMPLES | | | | | | | | | | | | |
| 1 | Ferrous sulfate (ferrous ions) | 0.02 | 24 | | | | | 120,000 | Good Coating | 0.9 | 1 | <5 |
| | Hydrogen peroxide | 0.5 | 20 | 1,100 | 1.6 | 800 | <1 | | | | | |
| 2 | Ferrous sulfate (ferrous ions) | 0.03 | 24 | | | | | 150,000 | Good Coating | 1.5 | 0 | — |
| | Hydrogen peroxide | 1.0 | 14 | 2,500 | 1.8 | 1500 | <1 | | | | | |
| 3 | Ferrous sulfate (ferrous ions) | 0.02 | 24 | | | | | 165,000 | Good Coating | 1.2 | 0 | — |
| | Hydrogen peroxide | 0.5 | 16 | 1,800 | 1.8 | 800 | <1 | | | | | |
| 4 | Ferrous sulfate (ferrous ions) | 0.03 | 24 | | | | | 175,000 | Good Coating | 1.1 | 1 | <5 |
| | Hydrogen peroxide | 0.4 | 20 | 1,000 | 1.2 | 300 | <1 | | | | | |
| 5 | Ferric sulfate (ferric ions) | 0.03 | 24 | | | | | 180,000 | Good Coating | 1.4 | 0 | — |
| | Hydrogen peroxide | 0.4 | 18 | 1,500 | 1.5 | 800 | <1 | | | | | |
| COMPARATIVE | | | | | | | | | | | | |
| 1 | Ferrous sulfate (ferrous ions) | 0.02 | 24 | | | | | 13,000 | No Coating | 0.1 | 18 | 20 |
| | Hydrogen peroxide | 0.6 | 24 | 1,000 | 1.2 | 600 | <1 | | | | | |
| 2 | Ferrous sulfate (ferrous ions) | 0.05 | 24 | | | | | 5,000 | No Coating | 0.1 | 28 | 25 |
| | Hydrogen peroxide | 2.0 | 20 | 500 | 1.2 | 100 | <1 | | | | | |
| 3 | Ferrous sulfate (ferrous ions) | 0.003 | 24 | | | | | 10,500 | No Coating | 0.1 | 15 | 25 |
| | Hydrogen peroxide | 0.3 | 20 | 48,000 | 12.5 | 5,500 | 10.0 | | | | | |
| 4 | Ferrous sulfate (ferrous ions) | 0.03 | 24 | | | | | 180,000 | No Coating | 1.4 | 0 | — |
| | — | — | — | 64,000 | 12.5 | 6,000 | 10.0 | | | | | |
| 5 | — | — | — | | | | | 10,000 | No Coating | 0.002 | 25 | 25 |
| | Hydrogen peroxide | 1.0 | 24 | 3,000 | 1.6 | 3,000 | <1 | | | | | |
| 6 | No treatment | — | — | 85,000 | 14.0 | 7,600 | 11.0 | 10,000 | No coating | 0.002 | 30 | 65 |

Example 2

The effect of the combined use of iron ions and hydrogen peroxide was studied using seawater in a cooling water system of auxiliaries (the amount of seawater was 1,500 m³/hour) in a thermal power plant. This seawater was constantly supplied with iron ions at 0.02 mg/liter for preventing the corrosion of aluminum brass pipes. More particularly, the seawater was taken at about 2 m³/hour at an inlet of a heat exchanger of the cooling water system. These a water was divided into two streams, and passed through two model flow paths. In each of the two model flow paths, the adhering organisms study column and the corrosion study aluminum brass pipe were placed as in Example 1. Here, only one of the model flow paths received the aqueous solution of hydrogen peroxide at 0.6 mg/liter for 20 hours a day by the constant delivery pump.

The average flow speed was set to about 0.1 m/sec. and about 1.6 m/sec. in the adhering organisms study column and in the corrosion study aluminum brass pipe, respectively.

The supply of the seawater and the agents were continued for 30 days. Then evaluation was conducted in the same manner as in Example 1. Results are shown in Table 2.

The effect of the combined use of iron ions and hydrogen peroxide was studied using cooling brackish water in a condenser (of one-way type, the amount of cooling water was 1,000 m³/hour) in the plant. This brackish water was constantly supplied with iron ions at 0.01 mg/liter for preventing the corrosion of aluminum brass pipes.

More particularly, the brackish water was taken at about 3 m³/hour at an inlet of the condenser for cooling water. The brackish water was divided into two streams, and passed through two model flow paths. In each of the two model flow paths, the adhering organisms study column and the corrosion study aluminum brass pipe were placed as in Example 1. Here, only one of the model flow paths received the aqueous solution of hydrogen peroxide at 1 mg/liter for 20 hours a day by the constant delivery pump.

The average flow speed was set to about 0.1 m/sec. and about 1.5 m/sec. in the adhering organisms study column and in the corrosion study aluminum brass pipe, respectively.

The supply of the brackish water and the agents were continued for 40 days. Then evaluation was conducted in the same manner as in Example 1. Results are shown in Table 3.

TABLE 2

| Items | Used Agents | Use Amount (mg/L) | Adding Time (hr) | Blue Mussels Number (/m²) | Blue Mussels Average Length (mm) | Barnacles Number (/m²) | Barnacles Average Bottom Major Axis (mm) | Aluminum Brass Pipe Polarization Resistance Value ($\Omega/cm^2$) | Aluminum Brass Pipe Iron Coating Status (with Eye) | Aluminum Brass Pipe Amount of Adhering Iron (mg/cm²) | Aluminum Brass Pipe Number of Holes by Pitting Corrosion (/cm²) | Aluminum Brass Pipe Maximum Depth of Holes by Pitting Corrosion ($\mu$m) |
|---|---|---|---|---|---|---|---|---|---|---|---|---|
| Example | Ferrous sulfate (ferrous ions) | 0.02 | 24 | | | | | 110,000 | Good Coating | 1.7 | 2 | <5 |
| | Hydrogen peroxide | 0.6 | 20 | 1,200 | 1.5 | 1,000 | <1 | | | | | |
| Comparative Example | Ferrous sulfate (ferrous ions) | 0.02 | 24 | | | | | 105,000 | Good Coating | 1.9 | 2 | <5 |
| | Hydrogen peroxide | — | — | 68,000 | 15.0 | 7,800 | 12.0 | | | | | |

Example 3

A test was carried out using model flow paths in a chemical plant located near an estuary where adhesion of freshwater bivalves (*Limnoperna fortunei* kikuchii) causes obstruction in recent years.

TABLE 3

| Items | Used Agents | Use Amount (mg/L) | Adding Time (hr) | Freshwater Bivalves Number (/m²) | Freshwater Bivalves Average Length (mm) | Polarization Resistance Value ($\Omega/cm^2$) | Iron Coating Status (with Eye) | Aluminum Brass Pipe Amount of Adhering Iron (mg/cm²) | Aluminum Brass Pipe Number of Holes by Pitting Corrosion (/cm²) | Aluminum Brass Pipe Maximum Depth of Holes by Pitting corrosion ($\mu$m) |
|---|---|---|---|---|---|---|---|---|---|---|
| Example | Ferrous sulfate (ferrous ions) | 0.01 | 24 | | | 95,000 | Good Coating | 1.6 | 1 | <5 |
| | Hydrogen peroxide | 1.0 | 20 | 500 | 1.0 | | | | | |
| Comparative Example | Ferrous sulfate (ferrous ions) | 0.01 | 24 | | | 93,000 | Good Coating | 1.8 | 1 | <5 |
| | Hydrogen peroxide | — | — | 8,000 | 6.0 | | | | | |

According to the method of the present invention for preventing obstruction in aluminum brass pipes serving as a water flow path, the corrosion, especially the pitting corrosion, of the aluminum brass pipes can be prevented without impeding the formation of corrosion-resistant coatings from iron ions. Also organisms can be remarkably prevented from adhering to metal surfaces and walls of the pipes of the water flow path.

What is claimed is:

1. A method for preventing obstruction in aluminum brass pipes in a water flow path, comprising:
   continuously supplying iron ions or an iron ion supply compound to water in the water flow path in such a manner that a concentration of iron ions in the water is 0.005 to 0.05 mg/liter; and
   supplying hydrogen peroxide or a hydrogen peroxide supply compound for a period of time sufficient for preventing adhesion of organisms to the aluminum brass pipes but not impeditive to formation of corrosion-resistant coating inside the pipes, in such a manner that a concentration of hydrogen peroxide in the water is 0.1 to 1.5 mg/liter,
   whereby corrosion of aluminum brass pipes and adhesion of organisms to the pipes are prevented.

2. The method according to claim 1, wherein hydrogen peroxide or the hydrogen peroxide supply compound is supplied for 14 to 20 hours a day.

3. The method according to claim 1, wherein hydrogen peroxide or the hydrogen peroxide supply compound is supplied for 16 to 20 hours a day.

4. The method according to claim 1, wherein the concentration of iron ions in the water is 0.01 to 0.03 mg/liter.

5. The method according to claim 1, wherein the iron ions are ferrous ions.

6. The method according to claim 1, wherein the iron ion supply compound is ferrous sulfate.

7. The method according to claim 1, wherein the concentration of hydrogen peroxide in the water is 0.2 to 1 mg/liter.

8. The method according to claim 1, wherein the iron ions or the iron ion supply compound and hydrogen peroxide or the hydrogen peroxide supply compound are supplied at the same place or at adjacent places between an entrance of an intake bay and an outlet conduit of a circulating pump for inhaling the water.

9. The method according to claim 1, wherein the water is seawater.

10. The method according to claim 1, wherein the water is brackish water.

* * * * *